(12) United States Patent
Yu

(10) Patent No.: US 6,684,750 B2
(45) Date of Patent: Feb. 3, 2004

(54) STRUCTURE OF A CONNECTION SEAT AND A SUSPENSION SEAT OF THE CONNECTION SEAT FOR A SUSPENSION ROUND SAW

(76) Inventor: Shi-Hui Yu, C/- Leong Chi Lei, PMB #1008, 1867 Ygnacio Valley Rd., Walnut Creek, CA (US) 94598

( * ) Notice: Subject to any disclaimer, the term of this patent is extended or adjusted under 35 U.S.C. 154(b) by 0 days.

(21) Appl. No.: 10/133,448

(22) Filed: Apr. 29, 2002

(65) Prior Publication Data

US 2003/0200851 A1 Oct. 30, 2003

(51) Int. Cl.⁷ .............................. B27B 5/24; B27B 5/32
(52) U.S. Cl. ........................ 83/473; 83/471.3; 83/477.1; 83/477.2; 83/581; 83/698.51
(58) Field of Search ................. 83/471.3, 477.2, 83/698.51, 581, 472, 473, 477, 477.1

(56) References Cited

U.S. PATENT DOCUMENTS

| | | | | |
|---|---|---|---|---|
| 5,239,906 A | * | 8/1993 | Garuglieri | 83/471.3 |
| 5,819,625 A | * | 10/1998 | Sberveglieri | 83/471.3 |
| 5,875,698 A | * | 3/1999 | Ceroll et al. | 83/477.2 X |
| 5,943,932 A | * | 8/1999 | Sberveglieri | 83/471.3 |
| 6,546,835 B2 | * | 4/2003 | Wang | 83/477.2 |

* cited by examiner

*Primary Examiner*—Charles Goodman
(74) *Attorney, Agent, or Firm*—Leong C. Lei

(57) ABSTRACT

This invention relates to structure of a connection seat and an improved structure of a suspension seat of a connection seat for a suspension round saw. The connection seat formed as one unit will not product error when the left-right angle of the sawing blade is adjusted and/or when the sawing blade moves up and down. The middle position of the suspension seat is provided with a plurality of securing sections so as the weight of the connection seat is distributed equally to the plurality of securing sections.

1 Claim, 7 Drawing Sheets

STRUCTURE OF A CONNECTION SEAT AND A SUSPENSION SEAT OF THE CONNECTION SEAT FOR A SUSPENSION ROUND SAW

BACKGROUND OF THE INVENTION (a) Field of the Invention

The present invention relates to structure of a connection seat and an improved structure of a suspension seat of a connection seat for a suspension round saw. The connection seat formed as one unit will not produce error when the left-right angle of the sawing blade is adjusted and/or when the sawing blade moves up and down. The middle position of the suspension seat is provided with a plurality of securing sections so as the weight of the connection seat is distributed equally to the plurality of securing sections.

(b) Description of the Art

FIGS. 1, 2 and 3 show conventional round saw. As shown in the FIGS., the first, the second, and the third connection seats 11, 12, and 13 are mounted within the interior of the round saw 10. The user cannot fasten the individual connection scat without unloading the connection seat. In view of the above, the connection seat of the conventional round saw 10 is unfit for practical purposes. Accordingly, it is an object of the present invention to provide a structure of a connection seat and an improved structure of a suspension seat for a suspension round saw.

SUMMARY OF THE INVENTION

Accordingly, it is an object of the present invention to provide an improved structure of a connection seat and a suspension seat for the connection seat for the round saw, wherein the connection seat is formed as one unit having a rectangular shape, the lower section of one side is provided with arch-shaped threads which can be engaged with that of a screw rod, the longer side of the box body is provided with circular arch-shaped sliding slot which can be engaged with the sliding rail of the suspension seat at the two sides at the top end of the box body of the round saw and move altogether, an individual hole is provided at the longer side of the connection and are corresponding to each other and are provided for the pivotal insertion of a shaft having pre-mounted with an elevation seat, and the elevation seat is located within the interior of the connection seat, and the up down elevation seat is connected to the motor securing seat and the motor is secured at the motor securing seat, the elevation seat is mounted with a sawing blade securing seat which can mount with a swing blade, and a threaded block for engagement with the screw rod, thereby by means of clockwise rotation and reverse rotation, the sawing blade is elevated and/or lowered and the control of the arch-shaped thread at the lower section of one side of the connection seat will cause the sawing blade to swing left or right, the two ends of the suspension seat are provided individually a securing seat, and the outer side at the center section is provided with a plurality of securing sections at the top end of the box body.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
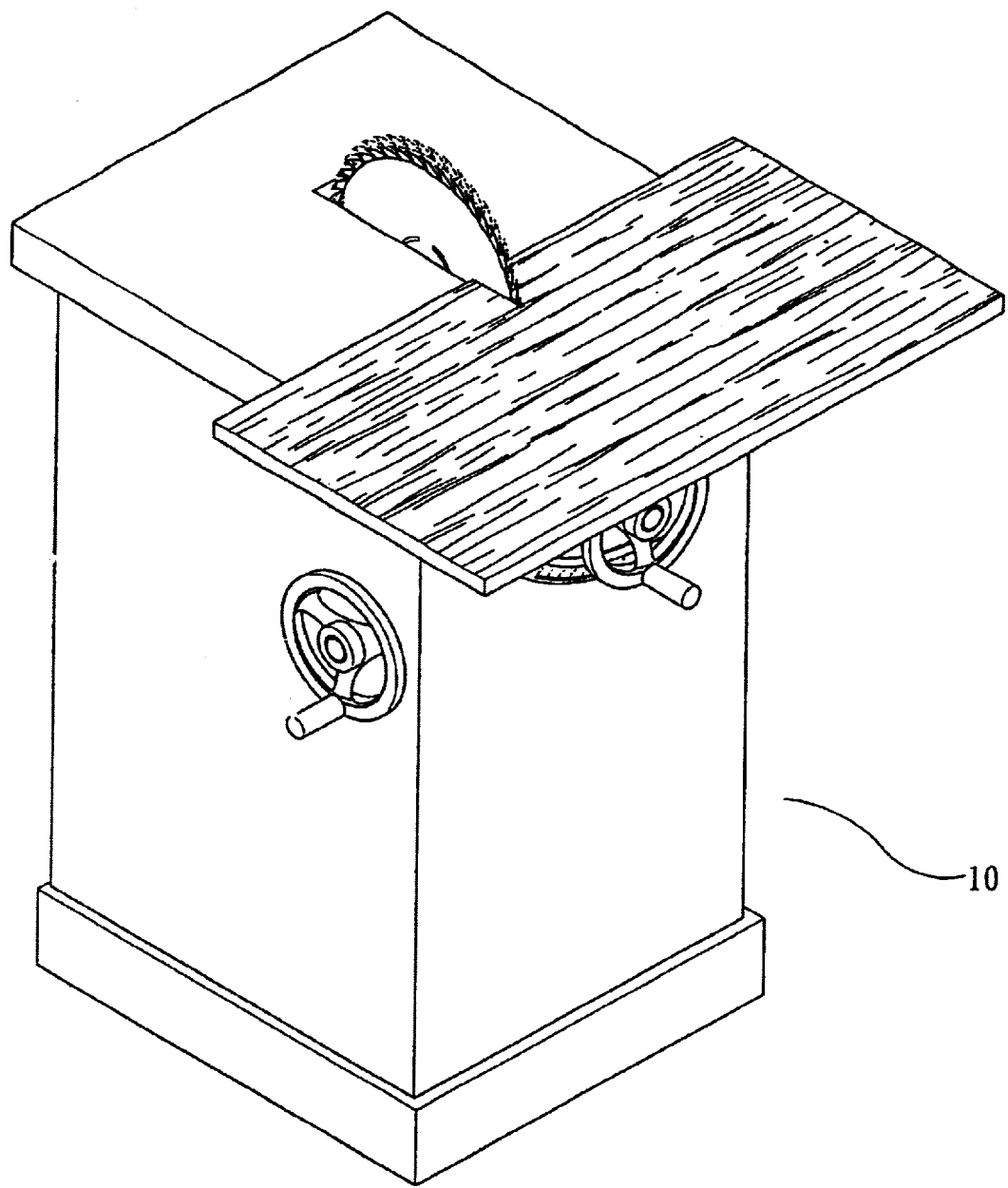
FIG. 1 is a schematic view showing the application of a conventional round saw.
Figure 2:
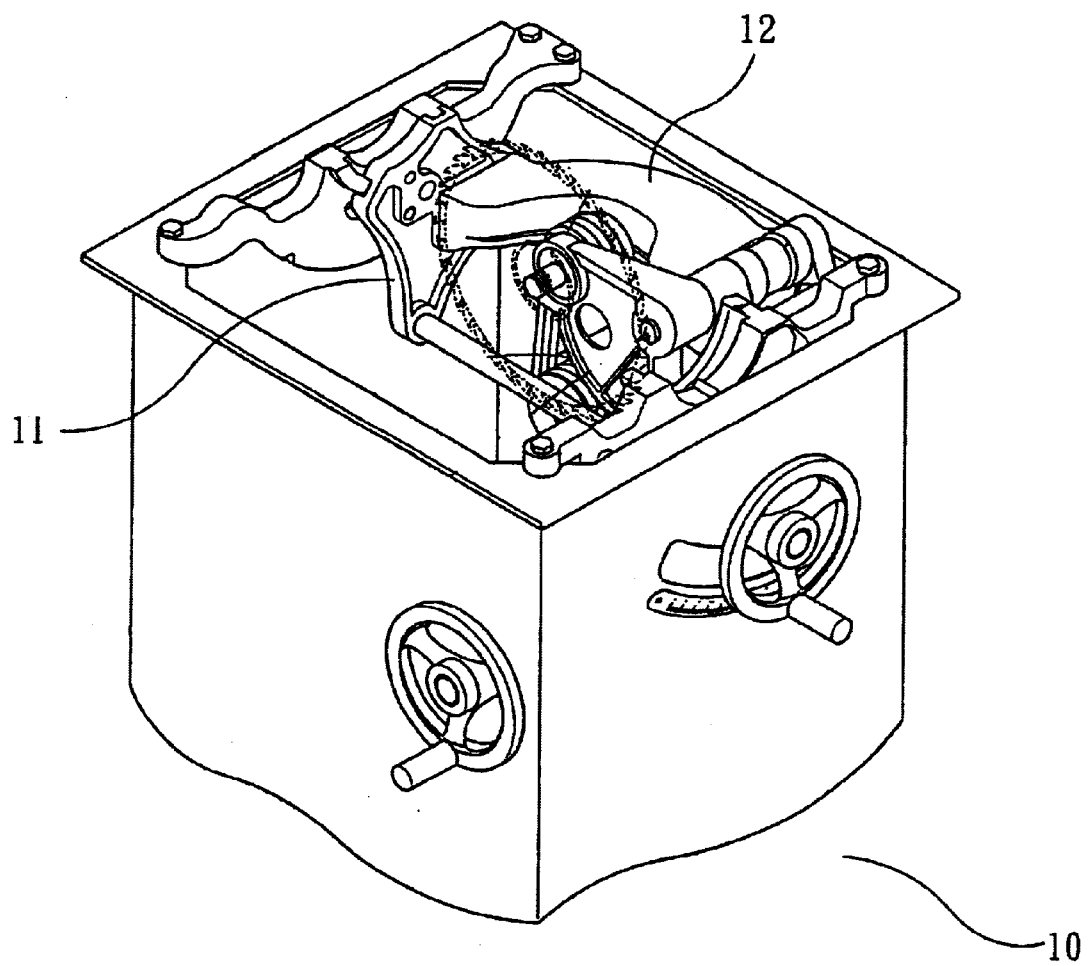
FIG. 2 is a schematic view showing the interior of a conventional round saw.
Figure 3:
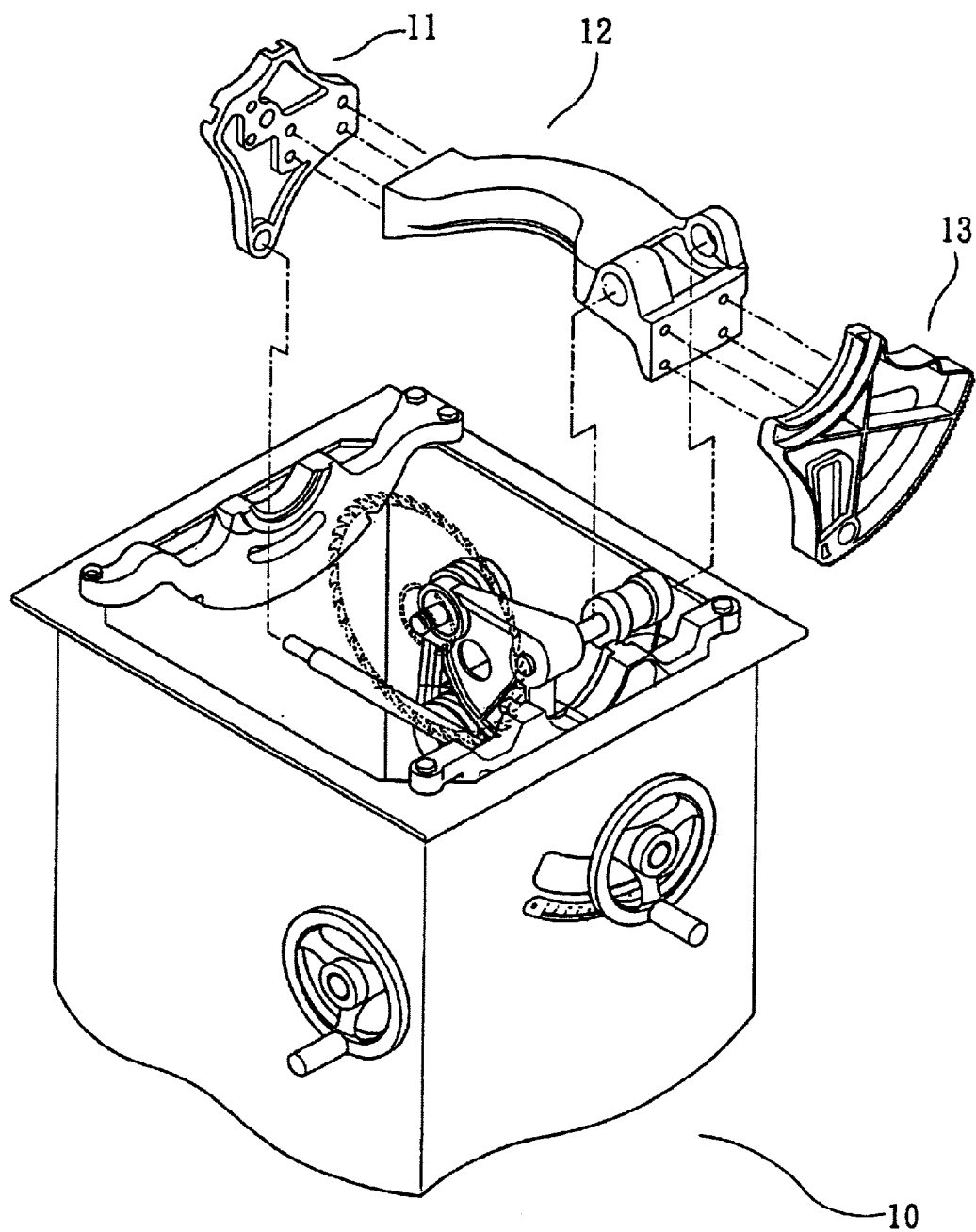
FIG. 3 is a perspective exploded view of the connection seat of a conventional round saw.
Figure 4:
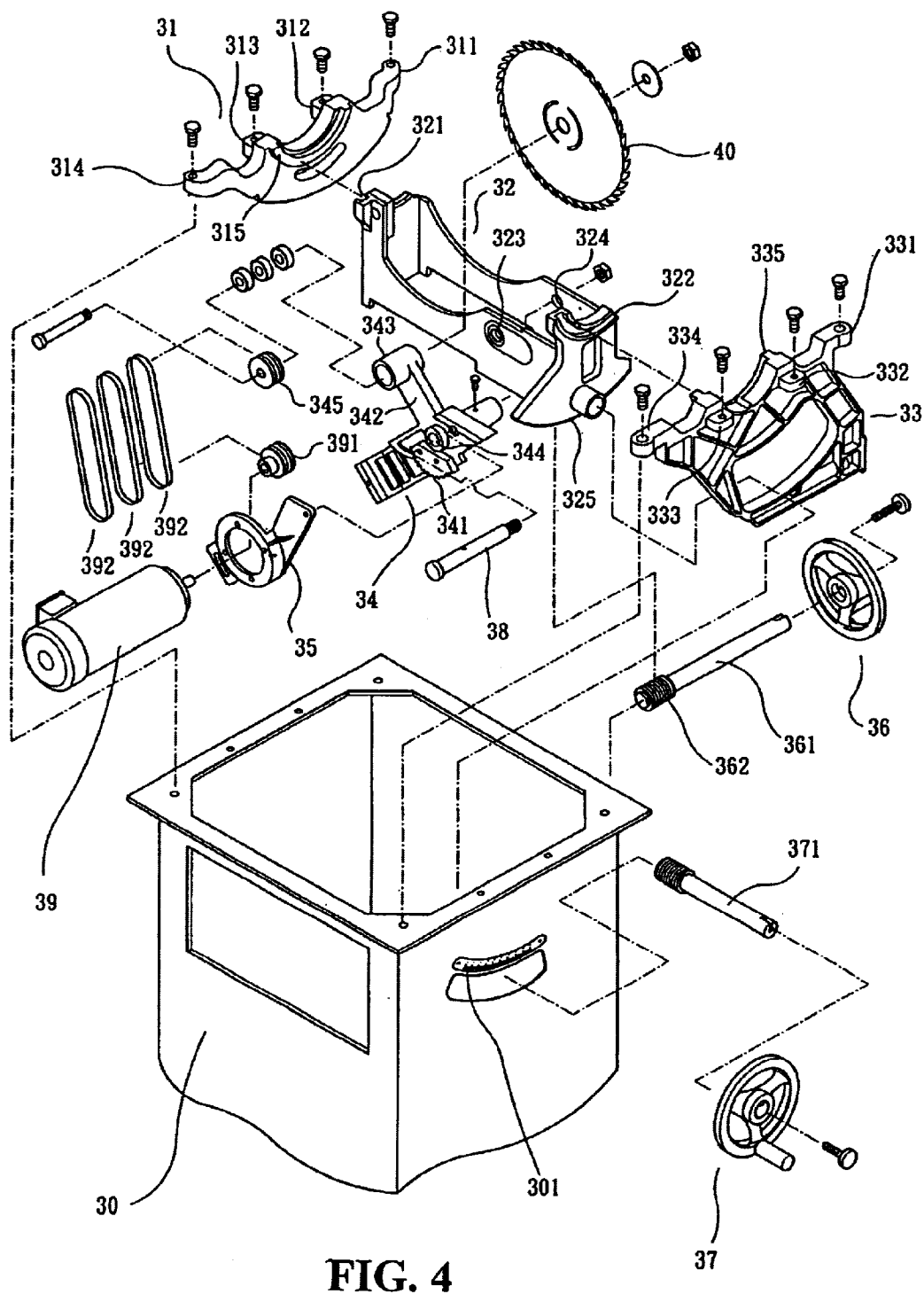
FIG. 4 is a perspective exploded view of the connection seat of a round saw in accordance with the present invention.
Figure 5:
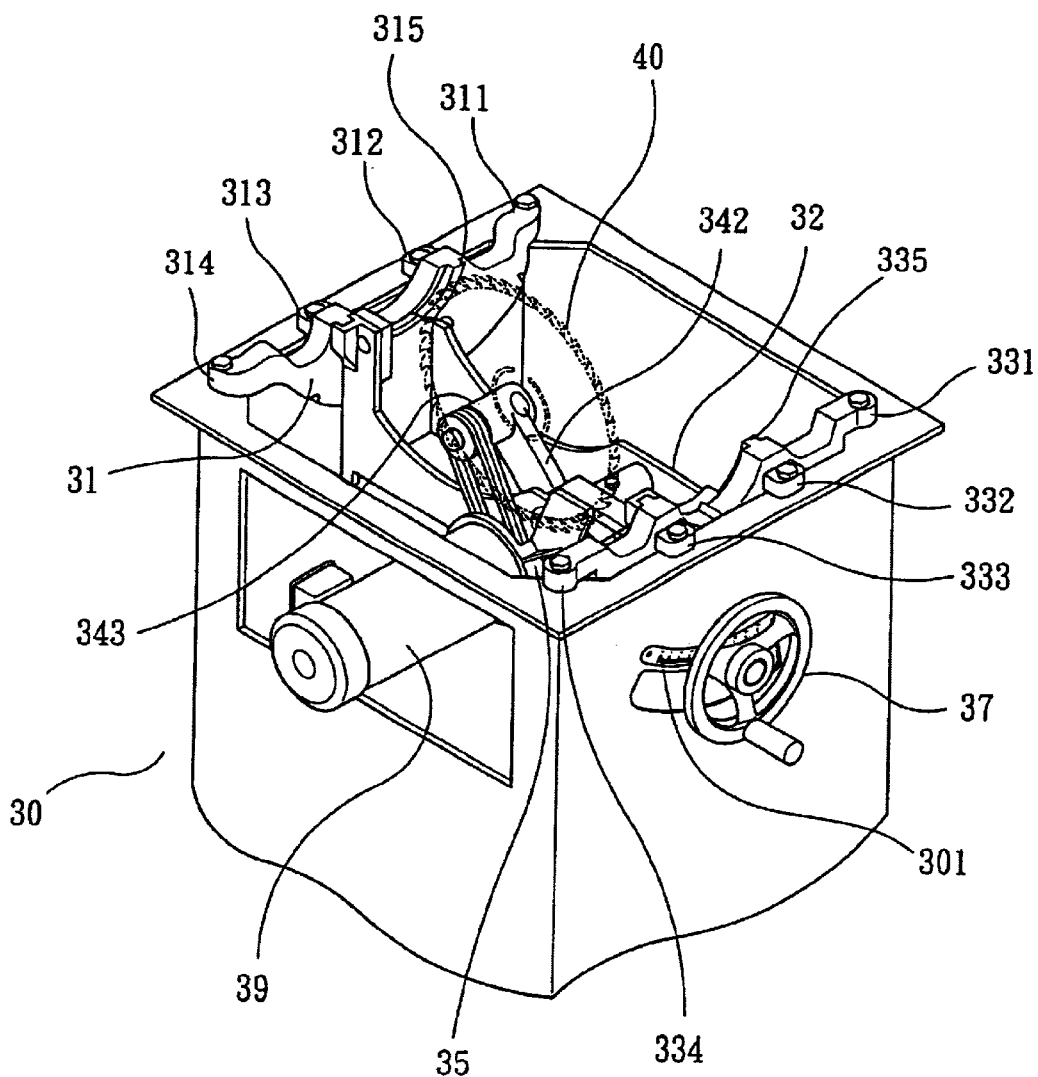
FIG. 5 is an interior installation drawings of the connection seat of a round saw in accordance with the present invention.
Figure 6A:
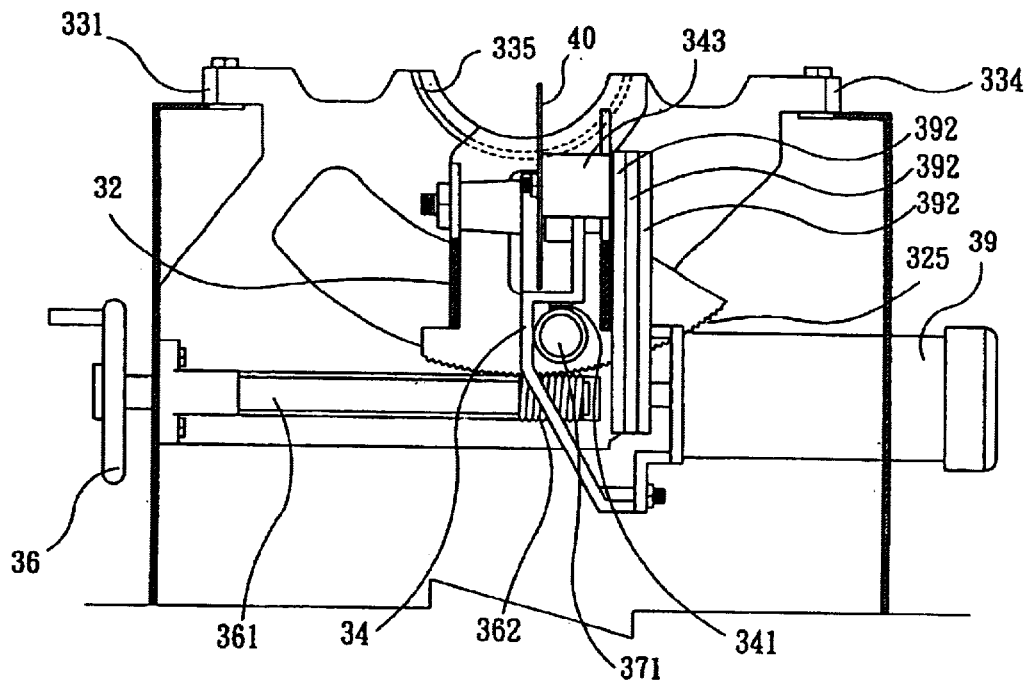
FIGS. 6A and 6B show the section views of the adjustment of swinging angle of the sawing blade.
Figure 6B:
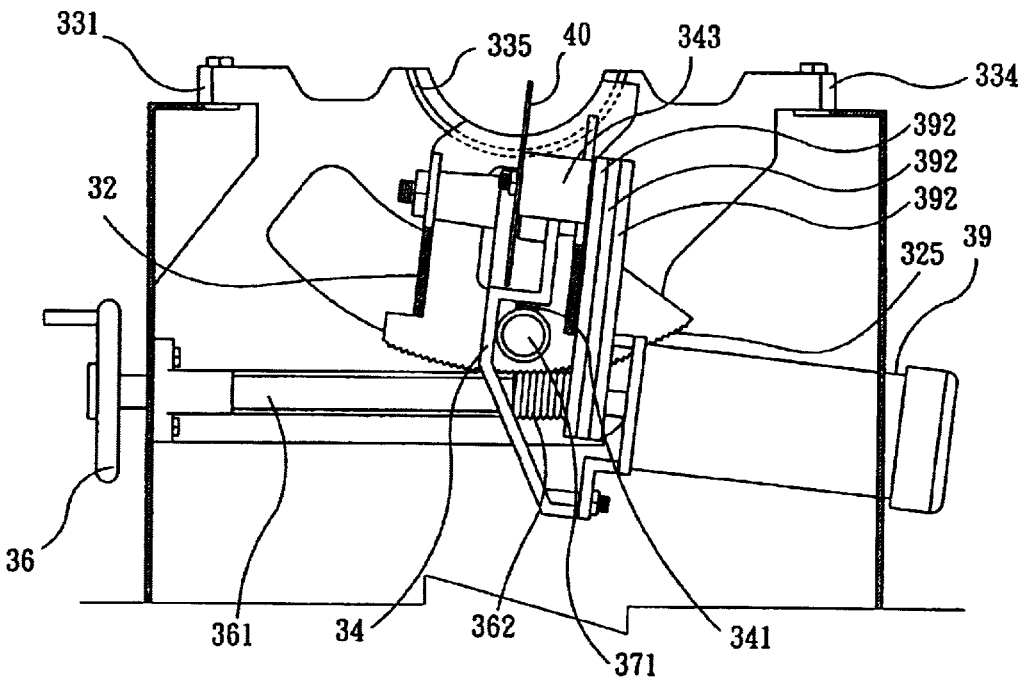
Figure 7A:
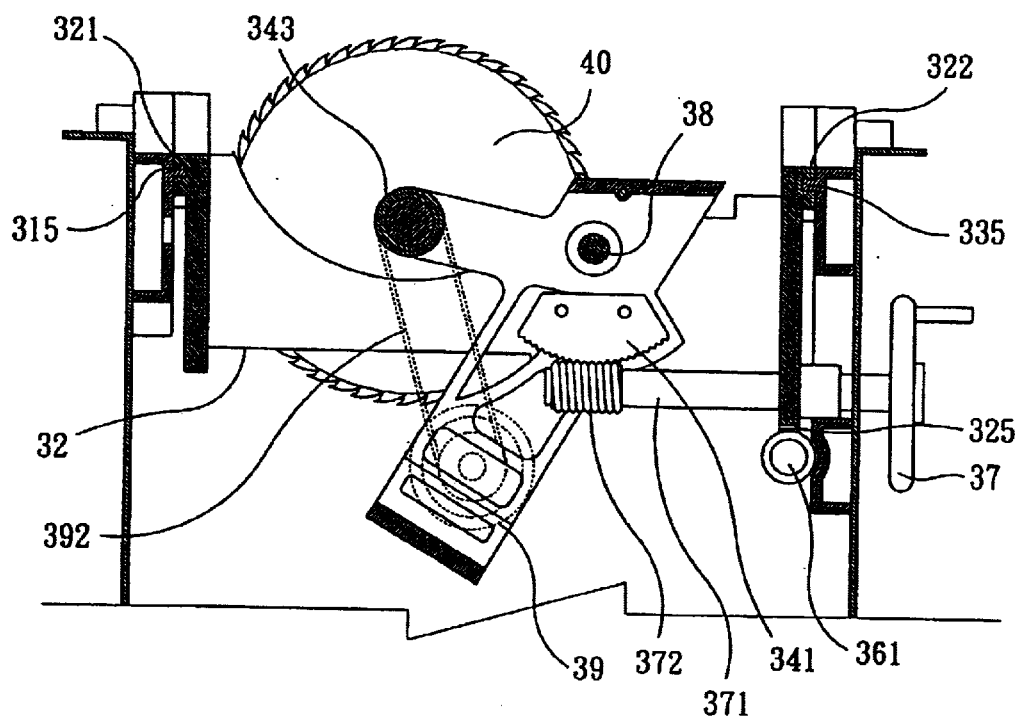
FIGS. 7A and 7B show the vertically up and down of the adjusting swing blade in accordance with the present invention.
Figure 7B:
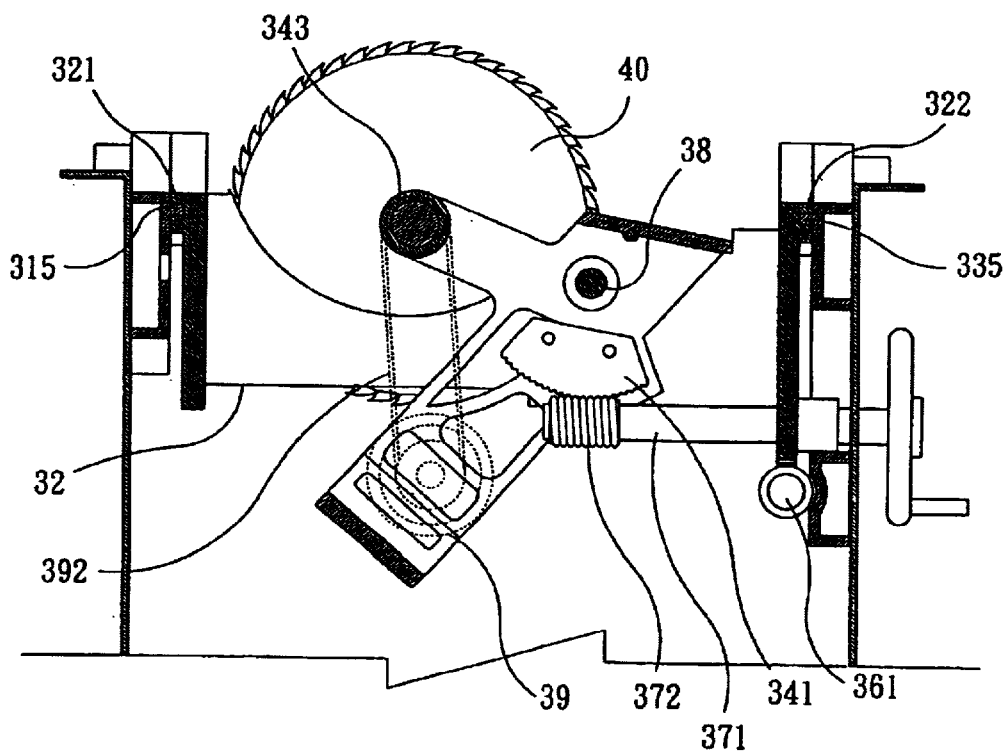

Referring to FIGS. 4 to 7, there is shown a connection seat 32 formed by the method of casting, wherein the arch-shaped sliding slots 321, 322 are provided at the two sides of the connection seat 32 and the right side of the lower section of the seat 32 is teeth-like threads 325. These parts are formed integrally as one unit. The threads 325 are engageable with the screw threads 362 of the screw rod 361. The screw rod 361 is connected with a hand wheel 36. The entire shape of the connection seat 32 is a rectangular body and the interior space thereof is in communication in a vertical direction. The longer sides of the rectangular body are provided correspondingly with through holes 323, 324. The through holes can be pivotally inserted by a shaft 38 and the shaft 38 is first mounted with an elevating scat 34 such that the elevating seat is located within the space of the connection seat. The front and the rear of the elevating seat are connected to the inner wall of the longer side of the connection seat 32. Due to the requirements with respect to functionality, the center position is provided with a through hole 344 for the insertion of the shaft 38. The left side of the through hole 344 is extended outward with a rotating arm 342 and the top end of the arm 342 is provided with sawing blade securing seat 343. The front end of the seat 343 is provided with a belted wheel 345 and the rear end thereof is pivotally mounted with a sawing blade 40. The lower section of the through hole 344 is positioned with a threaded block 341, which is controlled by a screw rod 371. The screw rod 371 is connected with a hand wheel 37. The front side of the elevation seat 34 is connected to the securing seat of a motor 39. The axle of the motor 39 is provided with a belted wheel 391, and the middle of the belted wheels 391 and 345 is mounted with a plurality of belts 392. As mentioned earlier, the connection seat 32, the elevation seat 34, the motor securing seat 35, and the motor 39 are combined to form one unit. The above parts are engaged and suspended within the box body 30 by employing the arch-shaped sliding slots 321, 322 and the sliding rails 315, 335 of the first, the second suspension seats 31, 33. The front and the rear ends of the first and the second suspension seats 31, 33 are provided with a securing sections 311, 314, 331, and 334, and the securing sections 311, 314, 331, 334 are provided wit a through hole for the mounting of screw nuts to the swing box body 30 at the top end thereof. In accordance with the present invention, the weight increases due to the connection seat 32 can be distributed at the first and the second connection seats 31,33 of the combined structure at the middle of the elevation seat 34. This will not cause error as a result of extended time of application of the sawing blade 40 or the adjustment of the swing angle of the adjustment of the up and down elevation. Thus the user can adjust the swinging angle and the up and down distance with the saw based on the calibrated reading 301 to obtain wood of good quality. This is the main advantage of the present invention. A plurality of securing sections 312, 313, 332, 333 located at the outer side of the first and the second connection seats 31, 33, are equally distributed to the connection seat 32 and the weight of other components. Accordingly, the swing process is smooth and this is a second advantage.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A suspension round saw comprising:

a rectangular connection seat having two long sides and two short sides, said short sides being each formed with an arch-shaped sliding slot, one of said short sides being provided with threads, said threads being engaged with threads of a first screw rod, said long sides being each provided with a through hole;

an elevating seat mounted within said rectangular connection seat by a shaft extending through a hole of said elevating seat and said through hole of said long sides, said elevating seat having an ann provided at an outer end with a sawing blade securing seat, said sawing blade securing seat having an end side connected with a first belted wheel and another end side connected with a sawing blade, said elevating seat having a lower portion formed with threads engaged with threads of a second screw rod;

a motor securing seat connected with said elevating seat, a motor being secured on said motor securing seat and having an axle provided with a second belted wheel which is connected with said first belted wheel by a plurality of belts;

a first suspension seat having a sliding rail engaged with said arch-shaped sliding slot of one of said short sides, said first suspension scat having a plurality of securing sections securing on a top edge of a box body;

a second suspension seat having a sliding rail engaged with said arch-shaped sliding slot of one of said short sides, said second suspension seat having a plurality of securing sections securing on another top edge of said box body;

a first hand wheel connected with said first screw rod; and a second hand wheel connected with said second screw rod.

* * * * *